June 3, 1930. H. BECKER 1,761,864
PISTON COOLING DEVICE FOR INTERNAL COMBUSTION ENGINES
Filed Sept. 30, 1927
Fig. 1.
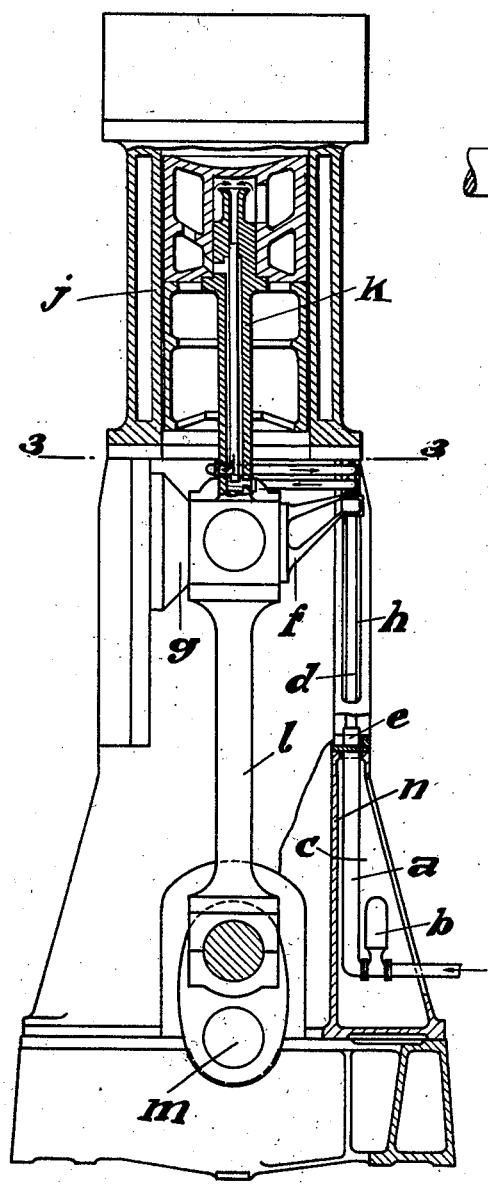
Fig. 3.
Fig. 2.
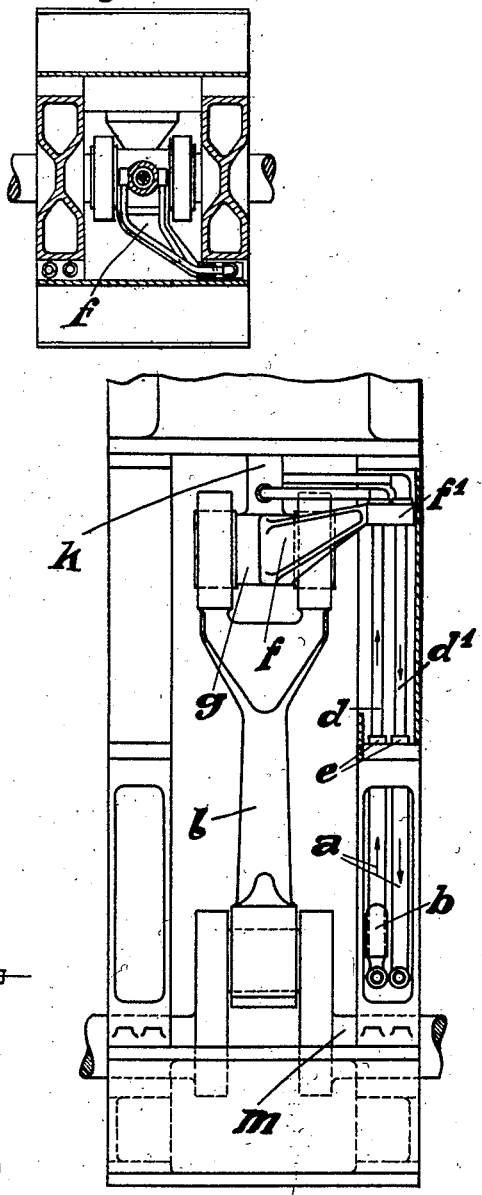
Inventor
Heinrich Becker
by
Maréchal and Noe
attorneys Patented June 3, 1930

1,761,864

UNITED STATES PATENT OFFICE

HEINRICH BECKER, OF AUGSBURG, GERMANY, ASSIGNOR TO THE FIRM MASCHINEN-FABRIK AUGSBURG-NUERNBERG AKTIENGESELLSCHAFT, OF AUGSBURG, GERMANY, A CORPORATION OF GERMANY

PISTON-COOLING DEVICE FOR INTERNAL-COMBUSTION ENGINES

Application filed September 30, 1927, Serial No. 223,167, and in Germany October 12, 1926.

This invention relates to piston cooling devices for internal-combustion engines, of the type in which the supply of cooling water to, and discharge from, the piston is effected through so-called telescopic tubes. In known constructions of such cooling apparatus, the telescopic casings or jackets are as a rule arranged in respect of each cylinder in its transverse axial plane, either on the cylinder or on the engine frame or standard, and located inside or outside the crank chamber. This arrangement presents several drawbacks however; it affects in any case the accessibility and visibility of the moving parts; further if the telescopic casings are arranged in the crank chamber in the case of leaks either in them or in their pipe joints, as well as in the case of insufficiently tight stuffing boxes, trickling water from the piston cooling system may find its way to the crank bilge or sump and become mixed with the lubricating oil so that the latter becomes useless. If on the contrary the said casings are arranged outside the crank casing a loss of lubricating oil results owing to oil splashed being able to escape from the crank chamber through the slots provided in its casing or outer wall for the passage of the arms supporting the inner telescopic pipes.

According to the invention, in respect of each cylinder, one of each pair of telescopic members is arranged as a hollow body in the lower portion of the engine frame or standard, and the supporting arm for the co-operating telescopic members, which is laterally secure to the cross head, is directed obliquely outwards through a slot in the engine frame in such a manner that the slot is situated in a lateral wall, that is to say in a wall substantially parallel to the transverse axial plane of the cylinder but shifted laterally relatively thereto. In that way, the drawbacks, mentioned in the foregoing are eliminated; thus, the fixed telescopic members are carried out of the crank chamber and completely separated from the interior of the engine so that they can be readily interchanged or replaced without the engine being dismantled. Accessibility of the moving parts is maintained, any penetration of trickling water into the crank chamber and mixing with the lubricating oil is precluded, and finally, owing to the lateral arrangement of the slots in the frame or standard, the loss of splashed oil is avoided.

A construction according to the invention is illustrated by way of example in the accompanying drawing, in which:—

Figure 1 shows an end elevation, partly in section,

Figure 2 a front elevation and

Figure 3 a cross section on the line 3—3 of Figure 1.

In the example illustrated the invention is shown applied to an internal combustion engine having a cylinder $j$ in which operates a piston connected at $k$ to the cross-head $g$, which in turn is operated by the connecting rod $l$, from a crank-shaft $m$. The piston is cooled by a circulation of water or other cooling fluid which is supplied to and withdrawn from the piston through inlet and outlet conduits as follows: One of each pair of telescopic members $a$ with the air vessel $b$ is arranged in the interior of the lower portion of the hollow-engine standard $c$ so as to be separated from the interior of the engine by the wall $n$. The other telescopic tubes $d$, which are guided in stuffing boxes $e$ of the telescopic casings $a$, are secured to a supporting arm $f$ connected to the piston cross head $g$ and are provided outside of the engine above the fixed members $a$. The supporting arm $f$ is directed obliquely outwards in such a manner that the slot $h$, through which its end passes into the standard, is situated in the lateral wall of the latter, that is to say in a wall parallel to the transverse axial plane of the cylinder in which the connecting rod moves, but shifted laterally; in that way, the escape of splashed oil through the slots is avoided since the passage provided by the wall is directed substantially at right angles to the direction to which oil is splashed by the connecting rod. The connection of the telescopic tubes $d$ to the cooling chamber of the piston is effected in the usual manner through the hollow piston rod or through rising pipes.

Instead of arranging the telescopic casings $a$ in the lower portion of the engine frame or standard, the latter could if desired be constituted to form the telescopic casings, owing to which the construction would be somewhat simplified.

What I claim is:

1. In an engine, an engine frame, a piston, a cylinder for said piston supported by said engine frame, a connecting rod operably connected to said piston and operating in a transverse plane in said engine frame, liquid circulating tubes for said piston, means supporting said tubes for reciprocating movement with said piston, said engine frame having a slot through which said means extends, the slot being arranged in a portion of the engine frame which is substantially parallel with said transverse plane so that the passage through the slot is out of line with the splashing of the connecting rod, and stationary liquid conducting means telescopically engaging said tubes.

2. In an engine, an engine frame, a piston, a cylinder for said piston supported by said engine frame, a connecting rod operably connected to said piston and operating in a transverse plane in said engine frame, liquid circulating tubes for said piston, means supporting said tubes exteriorly of the engine frame for reciprocating movement with said piston but in a path displaced from the said transverse plane, said engine frame having a slot through which said means extends, said slot being provided in a portion of the engine frame which is considerably displaced from said transverse plane so that oil is not readily splashed through the slot by the connecting rod, and stationary liquid conducting means telescopically engaging said tubes.

3. In an engine, an engine frame, a piston, a cylinder for said piston supported by said engine frame, a connecting rod operably connected to said piston and operating in a transverse plane in said engine frame, liquid circulating tubes for said piston, means supporting said tubes for reciprocating movement with said piston, but in a direction displaced from the said transverse plane, said engine frame having a slot through which said means extends, arranged in a wall of the engine frame which is substantially parallel with said transverse plane, and stationary liquid conducting means separated from the interior of the engine and provided at the lower portion of the engine frame telescopically engaging said tubes.

4. In an engine, an engine frame, a piston, a cylinder for said piston supported by said engine frame, a connecting rod operating in a transverse plane, a cross-head operably interconnecting said connecting rod and said piston, inlet and outlet liquid circulating tubes for said piston, a supporting arm for said tubes projecting from said cross-head and directed obliquely outwards from the cross-head to support said tubes at points displaced from the said transverse plane, said engine frame having a slot through which said arm extends, the slot being arranged in a portion of the engine frame which is substantially parallel with said transverse plane but displaced therefrom so that the passage through the slot is out of line with the splashing of the connecting rod, and stationary liquid conducting means separated from the interior of the engine at the lower portion of said engine frame and telescopically engaging said tubes to provide for the inlet and outlet of cooling liquid.

In testimony whereof I have affixed my signature.

HEINRICH BECKER.